UNITED STATES PATENT OFFICE.

SIEGFRIED W. MAYER, LEOPOLD LOEWENSTEIN, AND BERNHARD MAYER, OF NEW YORK, N. Y.

IMPROVEMENT IN COMPOSITIONS FOR VARNISH.

Specification forming part of Letters Patent No. 169,714, dated November 9, 1875; application filed September 24, 1875.

*To all whom it may concern:*

Be it known that we, SIEGFRIED W. MAYER, LEOPOLD LOEWENSTEIN and BERNHARD MAYER, of the city of New York, in the State of New York, have invented a certain Compound of Varnish to be used in protecting and embellishing walnut and other woods, of which the following is a specification:

The compound constituting our improved varnish, with the proportions of the ingredients entering into it, may be stated thus: We take of gum-copal, ninety pounds; of alcohol, nine gallons; of benzine, ten gallons; and by process of churning we amalgamate these into a varnish. We then take of gum-gamboge, six pounds; of orange aniline, six ounces; of alcohol, one gallon; and when this mixture is thoroughly dissolved we filter it into the varnish above described and mix the whole well together. This combination of materials secures a compound, which in cheapness, in the hardness of surface obtained by its application, and in its adaptability for protecting and embellishing the surface of walnut and other woods, is a new, useful, and valuable substitute for gum-shellac varnish. The color of the material for different purposes may be changed at pleasure by substituting for orange a different shade of aniline.

We claim as new and desire to secure by Letters Patent—

An improved varnish, consisting of gum-copal, alcohol, benzine, gum-gamboge, and orange aniline, substantially in the proportions and for the purposes set forth.

SIEGFRIED W. MAYER.
LEOPOLD LOEWENSTEIN.
BERNHARD MAYER.

Witnesses:
T. R. HORLEY,
F. A. VALENTINE.